W. H. EARL.
ADJUSTABLE REEL.
APPLICATION FILED JAN. 15, 1910.
965,091.
Patented July 19, 1910.
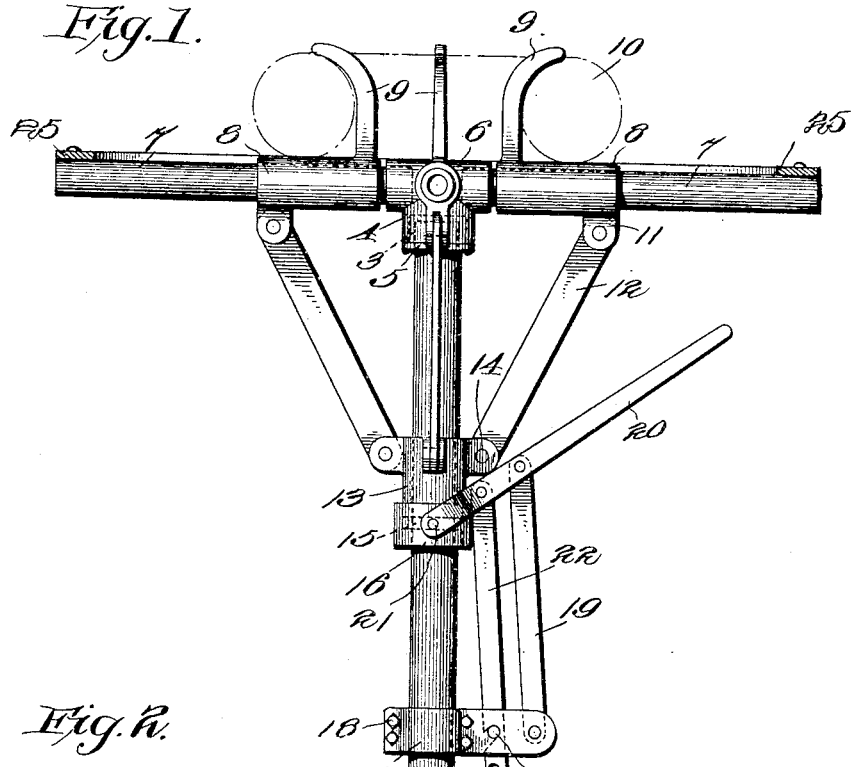
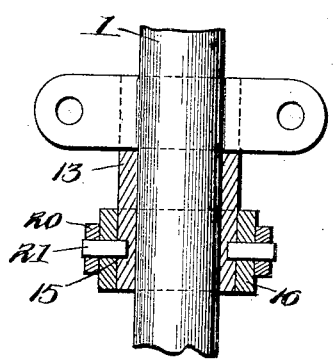
Witnesses
W. Mav. Duvall.
B. B. Collings.
Inventor
W. H. Earl,
By Wilkinson, Fisher & Witherspoon
Attorneys

UNITED STATES PATENT OFFICE.

WILLIAM H. EARL, OF NEW ORLEANS, LOUISIANA.

ADJUSTABLE REEL.

965,091.  Specification of Letters Patent.  Patented July 19, 1910.

Application filed January 15, 1910.  Serial No. 538,322.

*To all whom it may concern:*

Be it known that I, WILLIAM H. EARL, a citizen of the United States, residing at New Orleans, in the parish of Orleans and State of Louisiana, have invented certain new and useful Improvements in Adjustable Reels; and I do hereby declare the following to be a full, clear, and exact description of the invention, such as will enable others skilled in the art to which it appertains to make and use the same.

My invention relates to improvements in reels and is primarily intended for supporting a reel of wire when the wire is drawn off for any purpose, but is not restricted to this use.

The object of my invention is to produce a simple reel, inexpensive in construction, and one that may be used for almost any size of wire coil.

With this object in view, my invention consists in the construction and combination of parts as hereinafter described and claimed.

In the accompanying drawings:—Figure 1 represents a side elevation of my improved reel, with the ring in section. Fig. 2 is a cross section through a part of the adjusting means.

1 represents the supporting stem, usually made of wrought gas pipe. 2 represents a cast floor plate, in which the stem 1 is secured, said plate being secured to the floor. Any other form of fastening may be adopted, however, and instead of the plate 2 a base mounted on wheels may be used, so that the device may be easily transported from place to place.

3 represents a cast cap, which is screwed onto the upper end of the stem 1. On this cast cap is mounted a cast head 4. This head has a downwardly projecting portion, which is recessed and adapted to fit over the cap 3, being freely revoluble thereon. To prevent the head 4 from being detached from the cap 3, I provide a washer 5, fitting closely around the stem 1 and attached to the lower part of the head 4 by screws. The head 4 has cast integral therewith four or more equally distant sleeves 6, each sleeve being threaded on the interior, and into each of these sleeves is screwed a section of pipe 7, of any desired length. A flat metal ring 25, preferably made in sections, is fastened to the ends of the pipes 7. On each of the pipes 7 is arranged a sleeve 8, adapted to slide freely thereon, and provided with an upwardly and outwardly curved finger 9, against which a coil of wire 10 is adapted to rest. Ball bearings may, if desired, be placed between the cap 3 and head 4, and the pipe 7 and sleeves 8 may, if desired, be provided with splines or feathers, so as to prevent any tendency of the sleeves 8 to turn on the pipe 7, but ordinarily, in the cheap form of construction, these ball bearings and guides are not used. Each of the sleeves 8 has on its outer end a downwardly projecting split lug 11, to which is pivotally attached one end of a link 12.

13 represents a sleeve, loosely mounted on the stem 1, and adapted to slide up and down thereon and to revolve freely. This sleeve is provided at its upper part with a series of lugs, such as 14, and the link 12 connects the lugs 11 and 14, as shown in the drawing, the construction being the same for each one of the sleeves 8. The lower part of the sleeve 13 is provided with a circular groove 15, and surrounding the lower end of the sleeve 13 is mounted a ring or collar 16. Lugs 21 project through this collar into the groove 15 and project outside of it and are engaged by the forked ends of the arm 20, as clearly shown in Fig. 2. By the construction shown, the sleeve 13 may be raised or lowered by means of the ring 16, although said sleeve is allowed to turn freely. The ring 16 is adjusted up and down by means hereinafter described.

17 represents a lever support secured to the main stem 1. It consists of two pieces of iron of similar shapes, each having a half circle cut near one end thereof, fitting around the stem 1 and clamped thereto by means of bolts 18. Between the outer ends of the part 17 is pivotally mounted a link 19, furnishing a bearing for the operating lever 20, the other end of which is forked and pivoted on pins 21, carried by the ring 16. Obviously by a movement of the lever 20, the ring 16, and thereby the sleeve 13, may be raised or lowered, moving the sleeves 8 away from or toward the head 4.

To secure the sleeve 13 in its position when adjusted, a link 22 is provided, the upper end of which is pivotally attached to the lever 20. The lower end of the link 22 is provided with a series of slots 23, adapted to engage successively with the pin 24, carried between the two halves of the fastening device 17.

The operation is as follows:—The parts being substantially in the position shown in the figure, with the sleeves 8 resting against the head 4, a coil of wire is placed in engagement with the fingers 9 and the lever 20 operated, lifting the sleeve 13, forcing the sleeves 8 outwardly until they tightly engage the coil of wire, the parts being then locked by the link 22. When the desired amount of material has been used, the coil may be removed from the reel by reversing the operation.

I claim:—

1. The combination of a support, a reel mounted on said support and adapted to revolve freely thereon, said reel including radially arranged arms rigidly connected together at their outer ends and sleeves provided with fingers, adapted to slide on said arms, and means for adjusting said sleeves and locking them when adjusted, substantially as described.

2. The combination of a suitable support, a reel mounted on the top of said support and adapted to revolve freely thereon, means for preventing said reel from becoming disengaged from said support, said reel including radial arms and a rigid connection between said arms at their outer ends and sleeves provided with fingers, said sleeves being adapted to slide on said arms, and means for adjusting said arms and locking them when adjusted, substantially as described.

3. The combination of a suitable support, a reel mounted on the top of said support, including a head recessed to fit over the top of said support, means for preventing said head, when placed in position, from being disengaged from said support, but allowing said reel to revolve freely on said support, said reel also including a plurality of radial arms, sleeves adapted to slide freely on said arms, each sleeve being provided with a curved finger, and means for adjusting said sleeves toward and away from said head and for locking them when adjusted, substantially as described.

4. The combination of a suitable support, a reel mounted on the top of said support and adapted to revolve freely thereon, said reel including a head, radial arms carried by said head, and sleeves provided with fingers, said sleeves being adapted to slide on said arms, and means for adjusting said sleeves, including a sleeve movably mounted on said support, links pivotally connected to said last named sleeve and to the first named series of sleeves, and means for moving said last named sleeve up and down on said support, substantially as described.

5. The combination of a suitable support, a reel revolubly mounted on said support, said reel including a plurality of radially arranged arms and a sleeve adapted to slide freely on each of said arms, and means for adjusting said sleeves on said arms, said means including a sleeve movably mounted on said support, a series of links pivotally connecting said last named sleeve with the foregoing series of sleeves, said last named sleeve being provided with a groove, a ring provided with lugs engaging said groove, a lever for adjusting said ring along said support, thereby moving said last named sleeve, and means for locking said lever, substantially as described.

6. The combination of a suitable support, a reel revolubly mounted on said support, said reel including a plurality of radially arranged arms, a ring connecting the outer ends of said arms, and a sleeve adapted to slide freely on each of said arms, means for adjusting said sleeves on said arms, and means for automatically locking the adjusting means, substantially as described.

In testimony whereof, I affix my signature, in presence of two witnesses.

WILLIAM H. EARL.

Witnesses:
CHAS. E. LIDDON,
H. O. VESY.